2,752,325
Patented June 26, 1956

2,752,325

REACTION PRODUCTS OF AN ORGANIC TIN COMPOUND WITH A GLYCOL ESTER OF A MERCAPTOCARBOXYLIC ACID, AND HIGH MOLECULAR WEIGHT HALOGENATED MATERIALS STABILIZED THEREWITH

William E. Leistner, Brooklyn, and William E. Setzler, Seaford, N. Y., assignors to Argus Chemical Laboratory, Inc., a corporation of New York No Drawing. Application May 23, 1952, Serial No. 289,683

13 Claims. (Cl. 260—45.75)

The present invention relates to novel organic derivatives of tetravalent tin. The invention is a further development of the co-pending application, Serial No. 270,531, filed February 7, 1952, now Patent No. 2,641,596.

The derivatives according to our invention are derived from tetravalent tin, wherein the tin is linked with two or three valences to a radical selected from the group of alkyl, aryl, oxyalkyl and oxyaryl, and the furfuryl and tetrahydrofurfuryl radicals, and with the remaining valences to the sulfur atom of a mercapto acid containing 2 to 4 carbon atoms, whose carboxylic group is esterified by a glycol containing 2 to 6 carbon atoms.

We obtain the novel derivatives of tin by preparing the glycol ester of a mercapto acid and subsequently reacting the ester with an organic tin oxide or an organic tin mono or dihalide.

Taking, for instance, the ethylene glycol ester of thioglycolic acid and reacting it with dibutyl tin oxide, we obtain a product corresponding to the following formula:

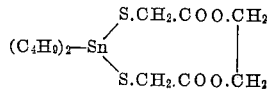

At the same time, the dimer of the above formulated reaction product may be formed, which corresponds to the following formula:

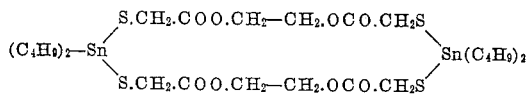

It is obvious that even further chain polymerization may occur in this condensation reaction.

The tin derivatives representing the one of our starting materials correspond to the formula R$_2$SnO, R$_2$SnX$_2$ or R$_3$SnX, wherein R stands for alkyls, such as methyl, ethyl, butyl, octyl, dodecyl, and octadecyl; aryls, such as phenyl, tolyl, or xylyl; oxyalkyls and oxyaryls, such as C$_3$H$_7$O, C$_4$H$_9$O, C$_8$H$_{17}$O, C$_6$H$_5$O, C$_6$H$_4$(CH$_3$)O; C$_6$H$_3$(CH$_3$)$_2$O; and the furfuryl and tetrahydrofurfuryl groups, and X stands for halogen.

Instead of using thioglycolic acid, we may use thiopropionic or thiobutyric acid. As glycols, we may use ethyleneglycol, propylene glycol, 1,4-butandiol, and similar glycols containing up to 6 carbon atoms.

The novel tin compounds according to our invention are jelly-like, light brownish materials, whose composition has been ascertained by analysis. They are soluble in many organic solvents, for instance in ether, benzene, toluene, chloroform, carbontetrachloride, or the like.

The invention will now be illustrated by a number of examples, but it should be understood that these are given by way of illustration and not of limitation and that many variations in the compounds given and the amounts indicated can be made without departing from the spirit of the invention and the scope of the appended claims.

The formulas given as representing the reaction products in the following examples, should be understood to represent only the products of lowest molecular weight. As stated before, dimers and polymers of these products are formed simultaneously and they are intended to be included in the appended claims.

Example 1

Preparation of the reaction product of 1,2-propyleneglycol thioglycolic acid ester with dibutyl tin oxide:

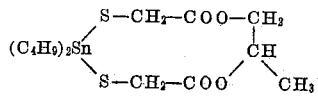

One mol propyleneglycol, 2 mols thioglycolic acid, and 100 cc. benzene, to which 0.3 g. of paratoluene sulfonic acid were added, are refluxed until 36 cc. of water are eliminated by azeotropic distillation.

To the reaction product, 1 mol dibutyl tin oxide is added, and the liquid is boiled until 18 cc. of water have been stripped off, the dibutyl tin oxide having completely dissolved by that time. Slight impurities are filtered off and the benzene is distilled off.

The residue is a jelly-like, light brownish material soluble in most organic solvents.

Analysis:

|  | Sn | S |
|---|---|---|
| Calc | 26.0 | 14.1 |
| Found | 25.2 | 14.0 |

Example 2

Preparation of the reaction product of ethyleneglycol thioglycolic acid ester with dibutyl tin oxide.

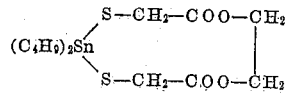

The procedure is exactly the same as described in Example 1, with the differece that instead of 1 mol propyleneglycol, 1 mol ethyleneglycol is reacted with 2 mols of thioglycolic acid.

The product obtained is in appearance and properties very similar to the one obtained according to Example 1.

Analysis:

|  | Sn | S |
|---|---|---|
| Calc | 26.8 | 14.5 |
| Found | 26.4 | 14.2 |

Example 3

Preparation of the reaction product of 1,4-butanediol thiopropionic acid ester with tribenzyl tin chloride.

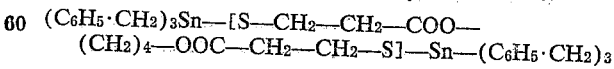

1 mol of 1,4-butanediol, 2 mols of thiopropionic acid, and 100 cc. benzene, to which 0.3 g. of paratoluenesulfonic acid were added, are refluxed until 36 cc. of water are eliminated by azeotropic distillation.

To the ester so formed, 2 mols tribenzyl tin chloride are added and refluxed for 1 hour. A current of nitrogen is passed through to eliminate the hydrochloric acid formed in the reaction. Slight impurities are filtered off and the benzene is distilled off. The product is in appearance and properties similar to the one obtained in Example 1.

Analysis:

|  | Sn | S |
|---|---|---|
| Calc | 22.6 | 6.1 |
| Found | 22.9 | 6.3 |

The novel compounds made according to the method described above may be used for various purposes. They are excellent stabilizers for chlorinated resins or other high molecular weight halogenated material, and may be used as antioxidants. They may also be interesting as such, or as intermediates for pharmaceuticals and cosmetics.

In case the compounds are used as stabilizers the amount of the same will be from 0.1–10%.

In the following, examples will be given for the manufacture of plastic products, in which the compound according to the present invention is used as a stabilizer.

*Example 4*

100 parts of Vinylite VYNW (vinyl chloride and acetate copolymer), 50 parts of dioctylphthalate, and 2 parts of the product made according to Example 1 as stabilizer, are mixed by tumbling for a period of one hour. The whole mass is then transferred to a Banbury mixer and fused for 10 min. at a temperature of approximately 300° F. It is then dropped and transferred to a warmup mill, whose roll temperature is likewise maintained at 300° F. The material is then fed as needed to a 3 or 4 roll calender. The roll temperatures of the calender range from 280°–350° F. The vinyl compound is calendered into a film at .004 inch or any other desirable gage.

*Example 5*

A comparison test was made in which chlorinated paraffin was heated over a period of time, without any addition on the one hand, and with addition of a stabilizer made according to the invention on the other hand.

In this test, a nitrogen current was passed through chlorinated paraffin containing 40% chlorine, at a temperature of 150° F. for 12 hours. During the test, the paraffin lost 10% chlorine.

The same chlorinated paraffin, to which 3% of the product obtained in Example 3 were added, was treated in a similar manner and showed a loss of only 0.8% chlorine after 12 hours.

*Example 6*

The following procedure is used to advantage in making a finished solution of the resin. We use 100 parts of Vinylite VYNW (vinyl chloride and acetate copolymer). This is weighed into a dry blender, 40 parts of tricresyl phosphate and 1 part of stabilizer (made as described in Example 2) are then added. The whole mass is agitated by tumbling for 30 minutes and then transferred to a 2-roll mill whose roll temperatures are at about 240° F. The mass is fluidized on the mill and then sheeted into strips which are added to a mixture consisting of 3 parts of methyl ethyl ketone and 1 part of toluene in a conventional mixer. The compound is agitated at room temperature in the mixer until complete solution results. The proportion of solvent used will vary with the concentration of solution desired, as, for instance, from 500 to 3,000 parts of solvent to 100 parts of the vinyl chloride resin used.

What we claim is:

1. A stabilized chlorine containing resinous composition containing 0.1% to 10% by weight of a compound of claim 12.

2. A stabilized composition comprising a chlorinated paraffin having from 10–40 carbon atoms per molecule and a compound of claim 12, in the amount of 0.1–10% by weight of the chlorinated paraffin.

3. A process for preparing organic compounds of tetravalent tin having 2–3 valences linked to a radical selected from the group consisting of alkyl, aryl, oxyalkyl and oxyaryl, and the furfuryl and tetrahydrofurfuryl radicals and the remaining valences to the radical of a thioglycolic acid ester, wherein the thioglycolic acid is esterified with ethylene glycol to form the di-ester of ethylene glycol, which process comprises first preparing said ester of thioglycolic acid and reacting it at elevated temperatures with a compound selected from the group consisting of organic tin monohalides, organic tin dihalides and organic tin oxides whereby the tin is linked to the di-ester through sulfur atoms.

4. A process for preparing organic compounds of tetravalent tin having 2–3 valences linked to a radical selected from the group consisting of alkyl, aryl, oxyalkyl and oxyaryl, and the furfuryl and tetrahydrofurfuryl radicals and the remaining valences to the radical of a thioglycolic acid ester, wherein the thioglycolic acid is esterified with 1,2-propylene glycol to form the di-ester of propylene, which process comprises first preparing said ester of thioglycolic acid and reacting it at elevated temperatures with a compound selected from the group consisting of organic tin monohalides, organic tin dihalides and organic tin oxides whereby the tin is linked to the di-ester through sulfur atoms.

5. A process for preparing organic compounds of tetravalent tin having 2.3 valences linked to a radical selected from the group consisting of alkyl, aryl, oxyalkyl and oxyaryl, and the furfuryl and tetrahydrofurfuryl radicals and the remaining valences to the radical of a thioglycolic acid ester, wherein the thioglycolic acid is esterified with 1,4 butanediol to form the di-ester of butanediol, which process comprises first preparing said ester of thioglycolic acid and reacting it at elevated temperatures with a compound selected from the group consisting of organic tin monohalides, organic tin dihalides, and organic tin oxides whereby the tin is linked to the di-ester through sulfur atoms.

6. A process for preparing a compound of the formula

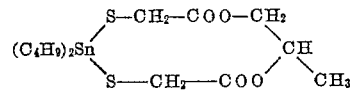

which comprises first preparing the 1,2 propyleneglycol thioglycolic acid di-ester and reacting it in molar proportions at elevated temperatures with dibutyl tin oxide.

7. A process for preparing a compound of the formula

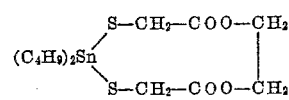

which comprises first preparing the ethyleneglycol di-ester of thioglycolic acid and reacting it in molar proportions at elevated temperatures with dibutyl tin oxide.

8. A process for preparing a compound of the formula $(C_6H_5-CH_2)_3Sn-[S-CH_2-CH_2-COO-$
$CH_2-CH_2-CH_2-CH_2-OOC-CH_2-$
$CH_2-S]-Sn-(C_6H_5-CH_2)_3$ which comprises first preparing the 1,4-butanediol di-ester of thiopropionic acid and reacting one mol of the ester with 2 mols of tribenzyl tin chloride at elevated temperatures.

9. As a new compound, the reaction product of an ester made from 2 moles of thioglycolic acid and one mole ethylene glycol with dibutyl tin oxide, the tin being linked in the reaction product through sulfur atoms.

10. As a new compound, the reaction product of an ester made from 2 moles of thioglycolic acid and one mole 1, 2 propylene glycol with dibutyl tin oxide, the tin being linked in the reaction product through sulfur atoms.

11. As a new compound, the reaction product of an ester made from 2 moles of thiopropionic acid and one mole 1, 4 butanediol with dibutyl tin oxide, the tin being linked in the reaction product through sulfur atoms.

12. As novel organic derivatives of tetravalent tin, the reaction products of an ester formed of two moles of a mercapto-substituted carboxylic acid containing 2–4 carbon atoms and one mole of a glycol containing 2–6 carbon atoms, with an organic tin derivative selected from the group of consisting of an organic tin oxide and organic tin mono-and dihalides, wherein 2–3 valences of the tin are linked to an alkyl radical and the remaining valences of the tin are linked to the sulfur atom of the ester radical of said mercapto-substituted carboxylic acid.

13. A process for preparing derivatives of tetravalent tin having 2–3 valences of the tin linked to an alkyl radical and the remaining valences linked to the radical of an ester formed of two moles of a mercapto-substituted carboxylic acid having from 2–4 carbon atoms and one mole of a glycol containing 2–6 carbon atoms, which process comprises first preparing the diester of said glycol with the mercapto-substituted acid and subsequently reacting it at elevated temperatures with a compound selected from the group consisting of an organic tin oxide, an organic tin mono halide and an organic tin dihalide.

References Cited in the file of this patent

UNITED STATES PATENTS

| | | |
|---|---|---|
| 2,479,918 | Fincke et al. | Aug. 23, 1949 |
| 2,489,518 | Burt | Nov. 29, 1949 |
| 2,591,675 | Church et al. | Apr. 8, 1952 |
| 2,592,926 | Mack et al. | Apr. 15, 1952 |
| 2,648,650 | Weinberg et al. | Aug. 11, 1953 |